(12) United States Patent
Seiden et al.

(10) Patent No.: US 12,436,942 B2
(45) Date of Patent: Oct. 7, 2025

(54) EDITING AND UPDATING DATABASE TABLES ON A CLOUD-BASED DATA WAREHOUSE

(71) Applicant: SIGMA COMPUTING, INC., San Francisco, CA (US)

(72) Inventors: Max H. Seiden, San Francisco, CA (US); Rodolphe Gagneron, San Diego, CA (US); Gregory G. Owen, San Mateo, CA (US)

(73) Assignee: SIGMA COMPUTING, INC., San Francisco, CA (US)

( * ) Notice: Subject to any disclaimer, the term of this patent is extended or adjusted under 35 U.S.C. 154(b) by 0 days.

(21) Appl. No.: 17/677,968

(22) Filed: Feb. 22, 2022

(65) Prior Publication Data
US 2023/0147197 A1      May 11, 2023

Related U.S. Application Data

(60) Provisional application No. 63/278,356, filed on Nov. 11, 2021.

(51) Int. Cl.
*G06F 16/23*     (2019.01)
*G06F 16/22*     (2019.01)
*G06F 16/28*     (2019.01)

(52) U.S. Cl.
CPC ...... *G06F 16/2379* (2019.01); *G06F 16/2282* (2019.01); *G06F 16/283* (2019.01)

(58) Field of Classification Search
CPC . G06F 16/2282; G06F 16/2379; G06F 16/283
See application file for complete search history.

(56) References Cited

U.S. PATENT DOCUMENTS

| | | | |
|---|---|---|---|
| 6,480,857 B1 | 11/2002 | Chandler | |
| 7,509,332 B1 | 3/2009 | Milby | |
| 7,949,633 B1 | 5/2011 | Shaver et al. | |
| 8,006,174 B2 * | 8/2011 | Aureglia | G06F 40/18 715/219 |
| 8,161,081 B2 * | 4/2012 | Kaufman | G06F 16/951 707/802 |

(Continued)

FOREIGN PATENT DOCUMENTS

WO     2023086504 A1     5/2023

OTHER PUBLICATIONS

International Search Report and Written Opinion, PCT/US2022/049594, Feb. 17, 2023, 14 pages.

*Primary Examiner* — Miranda Le (57) ABSTRACT

Editing and updating database tables on a cloud-based data warehouse including receiving, by a table manager via a client computing system, an instruction to edit a modified base table on the cloud-based data warehouse, wherein the instruction comprises a table edit targeting the modified base table; locating, by the table manager, a modifications table on the cloud-based data warehouse associated with the modified base table, wherein the modified base table comprises a base table and the modifications table; and servicing the instruction to edit the modified base table by generating a database statement targeting the cloud-based data warehouse to apply the table edit to the modifications table associated with the modified base table.

14 Claims, 5 Drawing Sheets

(56) References Cited

U.S. PATENT DOCUMENTS

| | | |
|---|---|---|
| 8,375,011 B2 | 2/2013 | Fox et al. |
| 8,510,266 B1 | 8/2013 | Ho et al. |
| 8,676,772 B2 * | 3/2014 | Gislason .............. G06F 16/2282 707/696 |
| 9,330,149 B2 * | 5/2016 | Angrish ................ G06F 16/258 |
| 9,690,764 B1 | 6/2017 | Batni |
| 10,025,801 B2 | 7/2018 | Kaufman et al. |
| 10,140,352 B2 * | 11/2018 | Hariharan ............ G06F 16/283 |
| 10,599,650 B2 | 3/2020 | Baeuerle et al. |
| 10,621,203 B2 * | 4/2020 | Hunt .................... G06F 16/283 |
| 10,713,178 B2 | 7/2020 | Yen et al. |
| 10,885,051 B1 * | 1/2021 | Peters .................. G06F 16/254 |
| 10,929,384 B2 * | 2/2021 | Karunanithi ........... G06F 11/30 |
| 10,956,447 B2 * | 3/2021 | Arnold ................ H04L 67/1023 |
| 10,977,220 B2 * | 4/2021 | Kaufman .............. G06F 16/20 |
| 10,990,571 B1 | 4/2021 | Zhang et al. |
| 11,100,101 B2 | 8/2021 | Zhao et al. |
| 11,137,987 B2 * | 10/2021 | Namarvar ............ G06F 16/435 |
| 11,163,791 B2 * | 11/2021 | Patel .................. G06F 16/2282 |
| 11,216,422 B2 * | 1/2022 | Cosic ................... G06F 16/21 |
| 11,354,493 B2 | 6/2022 | Von Tish et al. |
| 11,443,110 B2 | 9/2022 | Davis et al. |
| 11,636,408 B2 | 4/2023 | Sit et al. |
| 11,693,549 B2 * | 7/2023 | Stojanovic ............ G06T 11/206 707/805 |
| 11,709,809 B1 | 7/2023 | Li et al. |
| 2003/0177481 A1 | 9/2003 | Amaru et al. |
| 2003/0217033 A1 | 11/2003 | Sandler et al. |
| 2004/0088334 A1 | 5/2004 | Klein |
| 2004/0103365 A1 | 5/2004 | Cox |
| 2005/0097187 A1 | 5/2005 | Thompson et al. |
| 2007/0033518 A1 | 2/2007 | Kenna et al. |
| 2007/0043706 A1 | 2/2007 | Burke et al. |
| 2008/0016041 A1 * | 1/2008 | Frost .................... G06F 16/258 |
| 2009/0276692 A1 | 11/2009 | Rosner |
| 2010/0100558 A1 * | 4/2010 | Bakalash ............ G06F 16/2455 707/765 |
| 2010/0211862 A1 | 8/2010 | Parish et al. |
| 2010/0262647 A1 | 10/2010 | Malek et al. |
| 2010/0281372 A1 | 11/2010 | Lyons et al. |
| 2012/0311474 A1 * | 12/2012 | McPherson ............ G06F 16/26 707/687 |
| 2014/0229424 A1 * | 8/2014 | Gislason ............ G06F 16/2282 707/602 |
| 2015/0120687 A1 | 4/2015 | Bhattacharjee et al. |
| 2016/0162461 A1 | 6/2016 | Simon et al. |
| 2016/0321232 A1 * | 11/2016 | Tan .................... G06F 16/2465 |
| 2016/0321233 A1 * | 11/2016 | He ...................... G06T 11/206 |
| 2016/0378737 A1 | 12/2016 | Keslin et al. |
| 2017/0277743 A1 | 9/2017 | Jain et al. |
| 2017/0286454 A1 | 10/2017 | Saeki et al. |
| 2018/0082289 A1 | 3/2018 | Johnson et al. |
| 2018/0096043 A1 * | 4/2018 | Ledbetter ............ G06F 16/27 |
| 2018/0351781 A1 | 12/2018 | Movsisyan et al. |
| 2019/0095413 A1 * | 3/2019 | Davis .................. H04L 67/565 |
| 2019/0206231 A1 | 7/2019 | Armstrong et al. |
| 2019/0294688 A1 | 9/2019 | Mohan |
| 2019/0392063 A1 | 12/2019 | Tosukhowong et al. |
| 2020/0034365 A1 * | 1/2020 | Martin .............. G06F 16/24554 |
| 2020/0150938 A1 | 5/2020 | Stachura |
| 2021/0081364 A1 | 3/2021 | Jiang et al. |
| 2021/0081605 A1 | 3/2021 | Smith et al. |
| 2021/0149858 A1 * | 5/2021 | Xia .................... G06F 16/287 |
| 2021/0192601 A1 | 6/2021 | Dandy et al. |
| 2022/0043779 A1 | 2/2022 | Maddila et al. |
| 2023/0143272 A1 | 5/2023 | Seiden et al. |
| 2023/0145697 A1 | 5/2023 | Seiden et al. |
| 2023/0146077 A1 | 5/2023 | Seiden et al. |
| 2023/0147197 A1 | 5/2023 | Seiden et al. |
| 2023/0147424 A1 | 5/2023 | Seiden et al. |
| 2023/0195744 A1 | 6/2023 | Owen et al. |

* cited by examiner

EDITING AND UPDATING DATABASE TABLES ON A CLOUD-BASED DATA WAREHOUSE

CROSS-REFERENCE TO RELATED APPLICATIONS

This application is a non-provisional application for patent entitled to a filing date and claiming the benefit of earlier-filed U.S. Provisional Patent Application Ser. No. 63/278,356, filed Nov. 11, 2021, the contents of which are incorporated herein by reference in their entirety.

BACKGROUND

Field of the Invention

The field of the invention is data processing, or, more specifically, methods, apparatus, and products for editing and updating database tables on a cloud-based data warehouse.

Description of Related Art

Modern businesses may store large amounts of data in remote databases within cloud-based data warehouses. This data may be accessed using database statement languages, such as structured query language (SQL). Manipulating the data stored in the database may require constructing complex queries beyond the abilities of most users. Further, composing and issuing database queries efficiently may also be beyond the abilities of most users.

SUMMARY

Methods, systems, and apparatus for editing and updating database tables on a cloud-based data warehouse including receiving, by a table manager via a client computing system, an instruction to edit a modified base table on the cloud-based data warehouse, wherein the instruction comprises a table edit targeting the modified base table; locating, by the table manager, a modifications table on the cloud-based data warehouse associated with the modified base table, wherein the modified base table comprises a base table and the modifications table; and servicing the instruction to edit the modified base table by generating a database statement targeting the cloud-based data warehouse to apply the table edit to the modifications table associated with the modified base table.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION

Figure 1:
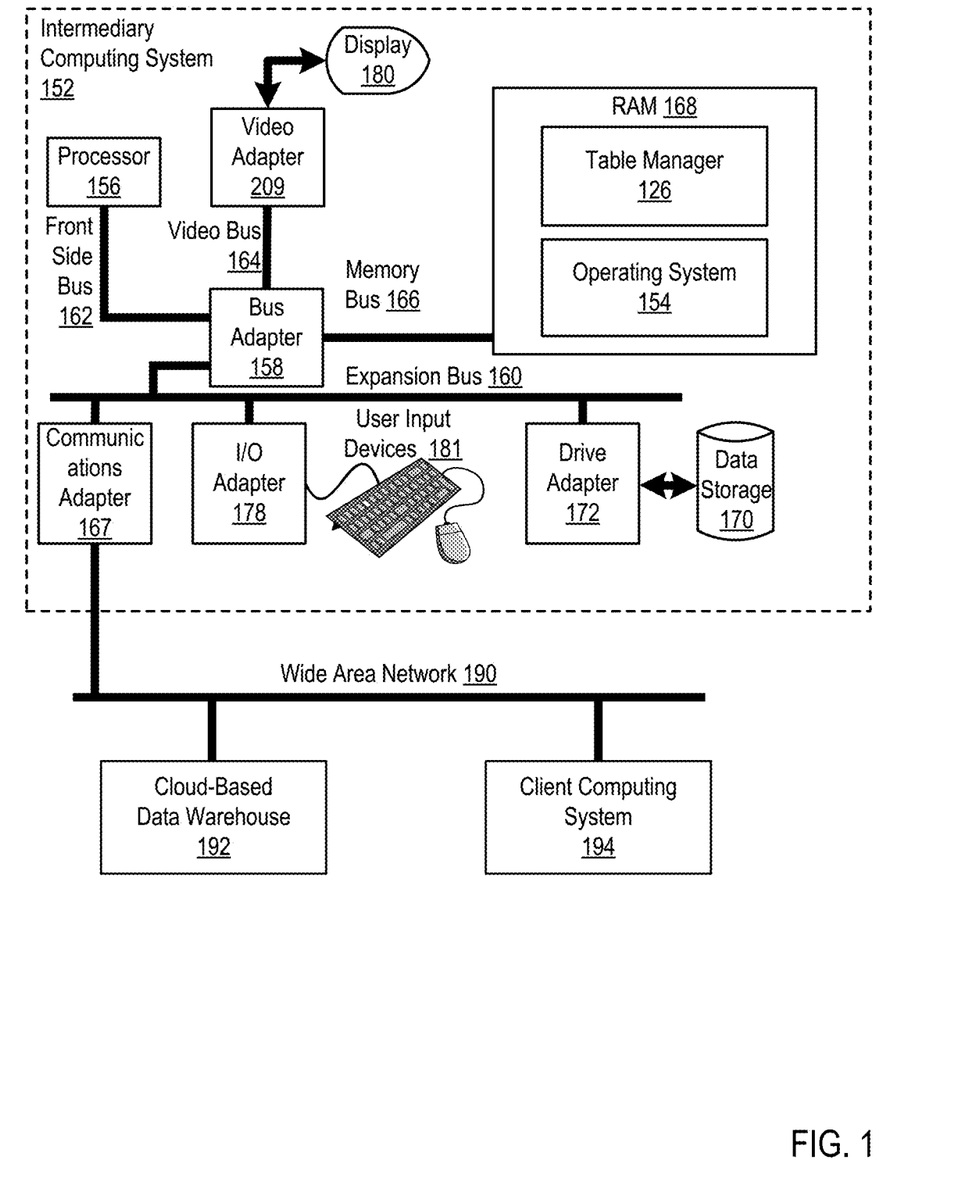
FIG. 1 sets forth a block diagram of an example system configured for editing and updating database tables on a cloud-based data warehouse according to embodiments of the present invention.

Exemplary methods, apparatus, and products for editing and updating database tables on a cloud-based data warehouse in accordance with the present invention are described with reference to the accompanying drawings, beginning with FIG. 1. FIG. 1 sets forth a block diagram of automated computing machinery comprising an exemplary intermediary computing system 152 configured for editing and updating database tables on a cloud-based data warehouse according to embodiments of the present invention. The intermediary computing system 152 of FIG. 1 includes at least one computer processor 156 or 'CPU' as well as random access memory 168 (RAM') which is connected through a high speed memory bus 166 and bus adapter 158 to processor 156 and to other components of the intermediary computing system 152.

Stored in RAM 168 is an operating system 154. Operating systems useful in computers configured for editing and updating database tables on a cloud-based data warehouse according to embodiments of the present invention include UNIX™, Linux™, Microsoft Windows™, AIX™, and others as will occur to those of skill in the art. The operating system 154 in the example of FIG. 1 is shown in RAM 168, but many components of such software typically are stored in non-volatile memory also, such as, for example, on data storage 170, such as a disk drive. Also stored in RAM is the table manager 126, a module for editing and updating database tables on a cloud-based data warehouse according to embodiments of the present invention.

The intermediary computing system 152 of FIG. 1 includes disk drive adapter 172 coupled through expansion bus 160 and bus adapter 158 to processor 156 and other components of the intermediary computing system 152. Disk drive adapter 172 connects non-volatile data storage to the intermediary computing system 152 in the form of data storage 170. Disk drive adapters useful in computers configured for editing and updating database tables on a cloud-based data warehouse according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example intermediary computing system 152 of FIG. 1 includes one or more input/output ('I/O') adapters 178. I/O adapters implement user-oriented input/output through, for example, software drivers and computer hardware for controlling output to display devices such as computer display screens, as well as user input from user input devices 181 such as keyboards and mice. The example intermediary computing system 152 of FIG. 1 includes a video adapter 209, which is an example of an I/O adapter specially designed for graphic output to a display device 180 such as a display screen or computer monitor. Video adapter 209 is connected to processor 156 through a high speed video bus 164, bus adapter 158, and the front side bus 162, which is also a high speed bus.

The exemplary intermediary computing system 152 of FIG. 1 includes a communications adapter 167 for data communications with other computers and for data communications with a data communications network. Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful in computers configured for editing and updating database tables on a cloud-based data warehouse according to embodiments of the present invention include modems for wired dial-up communications, Ethernet (IEEE 802.3) adapters for wired data communications, and 802.11 adapters for wireless data communications.

The communications adapter 167 is communicatively coupled to a wide area network 190 that also includes a cloud-based data warehouse 192 and a client computing system 194. The cloud-based data warehouse 192 is a computing system or group of computing systems that hosts a database or databases for access over the wide area network 190. The client computing system 194 is a computing system that accesses the database using the table manager 126.

Figure 2:
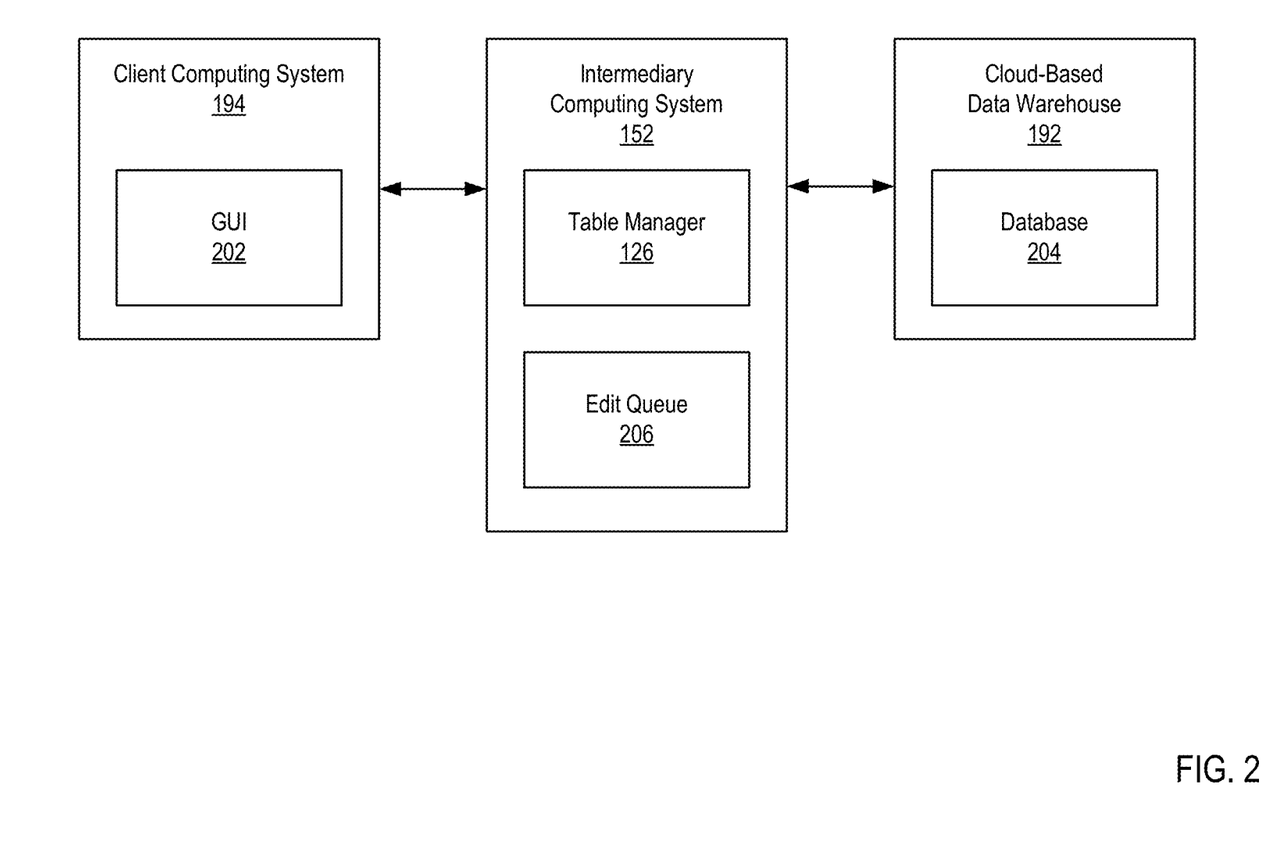
FIG. 2 sets forth a block diagram of an example system configured for editing and updating database tables on a cloud-based data warehouse according to embodiments of the present invention.

FIG. 2 shows an exemplary system for editing and updating database tables on a cloud-based data warehouse according to embodiments of the present invention. As shown in FIG. 2, the system includes a client computing system 194, an intermediary computing system 152, and a cloud-based data warehouse 192. The client computing system 194 includes a graphical user interface (GUI) 202. The intermediary computing system 152 includes a table manager 126 and an edit queue 206. The cloud-based data warehouse 192 includes a database 204. The client computing system 194 may access the cloud-based data warehouse 192 and database 204 via the table manager on the intermediary computing system 152.

The GUI 202 is a visual presentation configured to present data sets in the form of worksheets, workbooks, and graphical elements to a user. The GUI 202 also receives requests from a user for data sets from the database 204. The GUI 202 may also present to the user the ability to add a new row into a data set or table and enter values for each column of the new row. The GUI 202 may be presented, in part, by the table manager 126 and displayed on a client computing system 194 (e.g., on a system display or mobile touchscreen). The GUI 202 may be part of an Internet application that includes the table manager 126 and is hosted on the intermediary computing system 152.

The database 204 is a collection of data and a management system for the data. A data set is a collection of data (such as a table) from the database 204. Data sets may be organized into columns and rows (also referred to as records). The particular columns, rows, and organization of the columns and rows that make up a data set may be specified in the database statement requesting the data set.

Data sets may be sent from the cloud-based data warehouse 192 in response to a database statement (also referred to as a query). Accordingly, data sets retrieved in response to a database statement may be referred to as query results. The database may store the data sets that make up a base table and a modifications table.

The table manager 126 is hardware, software, or an aggregation of hardware and software configured to receive instructions in the form of state specifications from the client computing system 194, via the GUI 202. The table manager 126 is also configured to generate database statements in response to manipulations of the GUI 202 described in the state specification.

The state specification is a collection of data describing inputs into the GUI 202. The state specification may include manipulations of GUI elements within the GUI 202 along with data entered into the GUI 202 by a user of the client computing system 194. Such manipulations and data may indicate requests for and manipulations of data sets. Such manipulations and data may also indicate requests to edit an existing row or create a new row and values for that row. The state specification may be a standard file format used to exchange data in asynchronous browser-server communication. For example, the state specification may be a JavaScript Object Notation specification. The state specification may also include descriptions of elements that are used to apply changes to the data set. Such elements may include filters applied to the worksheet, the hierarchical level of the worksheet, joins performed within the worksheet, exposable parameters in the worksheet, and security for the worksheet.

The table manager 126 uses the state specification as input to generate a database statement. This database statement generation process may begin with state specification being converted into an abstract syntax tree. The abstract syntax tree may then be canonicalized into a canonicalized hierarchy. The canonicalized hierarchy may then be linearized into the worksheet algebra. The worksheet algebra may then be lowered into a relational algebra, which may then be lowered into the database statement.

The table manager 126 may use the database statement to fetch query results (i.e. a data set) from the database 204. The table manager 126 may then present the query results to a user via the GUI 202. The table manager 126 may further manage tables on the database 202 to which a user has made edits, such as adding new rows or editing existing rows. Further, the table manager 126 may add columns to new rows and create new tables on the database 202.

The edit queue 206 is a repository for uncommitted table edits made to an editable table. A table edit describes the change (e.g., add row, edit row, remove row, etc.) to be made to a table (e.g., a modifications table). Table edits in the edit queue 206 are sent to the database 204 on the cloud-based data warehouse 192 to be committed to the editable table. "Committed" as used herein refers to a table edit to the editable table that has been accepted by the database 204 on the cloud-based data warehouse 192 and is currently reflected in query results from the database 204. Similarly, "uncommitted" as used herein refers to any table edit that is not currently reflected in query results from the database 204. Note that a table edit is still reflected in query results even if that table edit has been deleted or overwritten by a later table edit.

Table edits may be sent individually or in batches to the database 204 on the cloud-based data warehouse 192. Further, table edits stored in the edit queue 206 may be stored as database statements (e.g., as structured query language statements). Alternatively, the table edits may be stored in an intermediate representation before being converted to a database statement and transmitted. Each uncommitted table edit may be held in the edit queue 206 until a commitment acknowledgement for the uncommitted table edit is received from the cloud-based data warehouse 192. The edit queue 206 may also include a mechanism to service requests from the table manager 126. Specifically, the edit queue 206 may include the ability to respond to requests from the table manager 126 and provide rows from the uncommitted edits in response.

Figure 3:
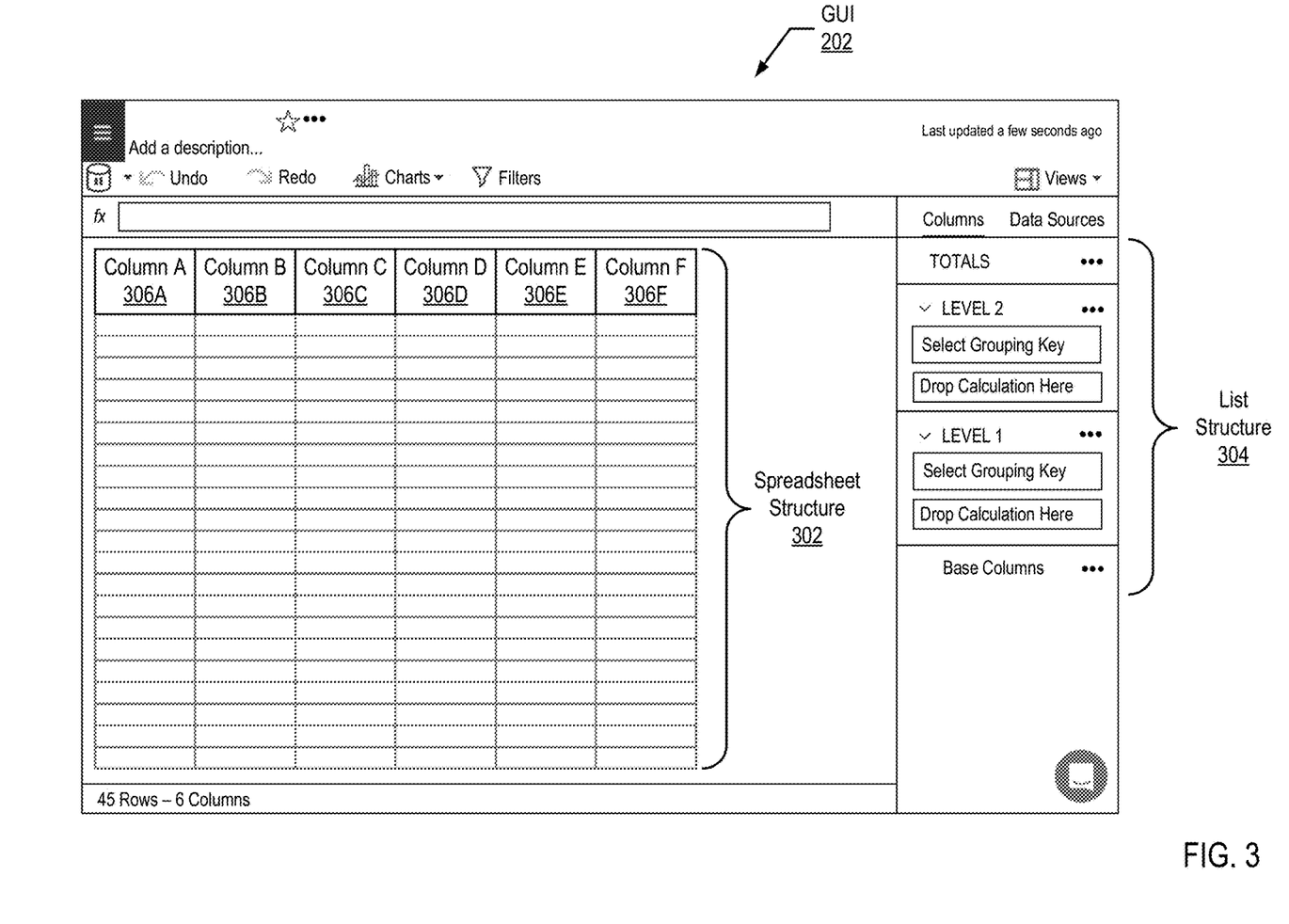
FIG. 3 sets forth a block diagram of an example system configured for editing and updating database tables on a cloud-based data warehouse according to embodiments of the present invention.

FIG. 3 shows an exemplary system for editing and updating database tables on a cloud-based data warehouse according to embodiments of the present invention. As shown in FIG. 3, the exemplary GUI 202 includes a spreadsheet structure 302 and a list structure 304. The spreadsheet structure 302 includes a worksheet (shown as empty rows) with six columns (column A 306A, column B 306B, column C 306C, column D 306D, column E 306E, column F 306F). The combination of a worksheet and dynamic graphic elements may be referred to as a workbook.

The spreadsheet structure 302 is a graphical element and organizing mechanism for a worksheet that presents a data set. A worksheet is a presentation of a data set (such as a table) from a database on a data warehouse. The spreadsheet structure 302 displays the worksheet as rows of data organized by columns (column A 306A, column B 306B, column C 306C, column D 306D, column E 306E, column F 306F). The columns delineate different categories of the data in each row of the worksheet. The columns may also be calculation columns that include calculation results using other columns in the worksheet.

The list structure 304 is a graphical element used to define and organize the hierarchical relationships between the columns (column A 306A, column B 306B, column C 306C, column D 306D, column E 306E, column F 306F) of the data set. The term "hierarchical relationship" refers to subordinate and superior groupings of columns. For example, a database may include rows for an address book, and columns for state, county, city, and street. A data set from the database may be grouped first by state, then by county, and then by city. Accordingly, the state column would be at the highest level in the hierarchical relationship, the county column would be in the second level in the hierarchical relationship, and the city column would be at the lowest level in the hierarchical relationship.

The list structure 304 presents a dimensional hierarchy to the user. Specifically, the list structure 304 presents levels arranged hierarchically across at least one dimension. Each level within the list structure 304 is a position within a hierarchical relationship between columns (column A 306A, column B 306B, column C 306C, column D 306D, column E 306E, column F 306F). The keys within the list structure 304 identify the one or more columns that are the participants in the hierarchical relationship. Each level may have more than one key.

One of the levels in the list structure 304 may be a base level. Columns selected for the base level provide data at the finest granularity. One of the levels in the list structure 304 may be a totals or root level. Columns selected for the totals level provide data at the highest granular level. For example, the totals level may include a field that calculates the sum of each row within a single column of the entire data set (i.e., not partitioned by any other column).

The GUI 202 may enable a user to drag and drop columns (column A 306A, column B 306B, column C 306C, column D 306D, column E 306E, column F 306F) into the list structure 304. The order of the list structure 304 may specify the hierarchy of the columns relative to one another. A user may be able to drag and drop the columns in the list structure 304 at any time to redefine the hierarchical relationship between columns. The hierarchical relationship defined using the columns selected as keys in the list structure 304 may be utilized in charts such that drilling down (e.g., double click on a bar), enables a new chart to be generated based on a level lower in the hierarchy.

The GUI 202 may also include a mechanism for a user to request a table from a database to be presented as a worksheet in the GUI 202. Such a mechanism may be part of the interactivity of the worksheet. Specifically, a user may manipulate a worksheet (e.g., by dragging and dropping columns or rows, resorting columns or rows, etc.) and, in response, the GUI 202 may generate a request (e.g., in the form of a state specification) for a data set and send the request to the table manager 126. Such a mechanism may also include a direct identification of the rows and columns of a database table that a user would like to access (e.g., via a selection of the rows and columns in a dialog box). The GUI 202 may also include a mechanism for a user to create a new table on the database, add rows to a table, and move rows within the table.

Figure 4:
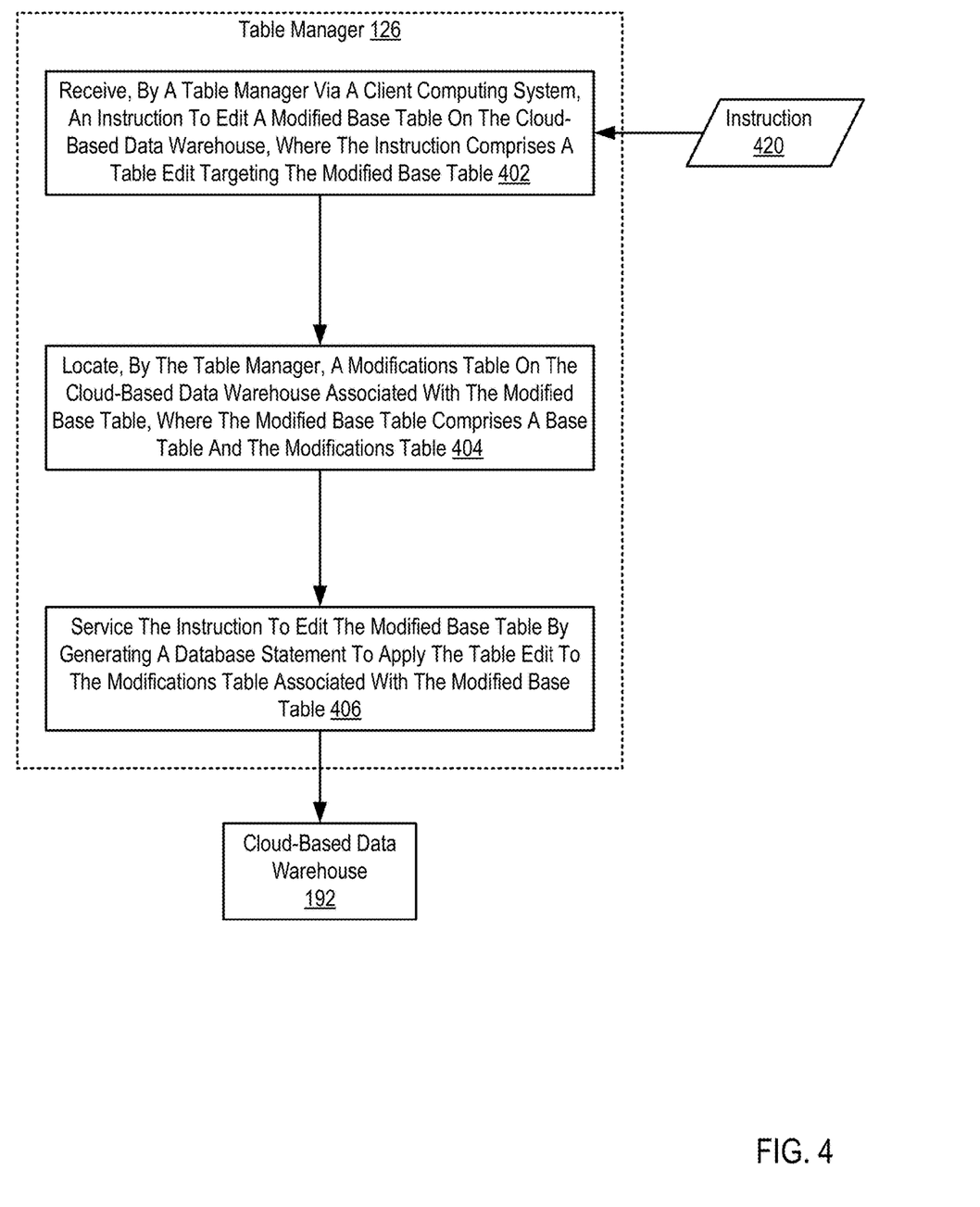
FIG. 4 sets forth a flow chart illustrating an exemplary method for editing and updating database tables on a cloud-based data warehouse according to embodiments of the present invention.

For further explanation, FIG. 4 sets forth a flow chart illustrating an exemplary method for editing and updating database tables on a cloud-based data warehouse according to embodiments of the present invention that includes receiving 402, by a table manager 126 via a client computing system, an instruction 420 to edit a modified base table on the cloud-based data warehouse 192, wherein the instruction 420 comprises a table edit targeting the modified base table. Receiving 402 the instruction 420 to edit a modified base table on the cloud-based data warehouse 192 may be carried out by detecting that a user has manipulated elements of the GUI and/or submitted data using the GUI such that the generation of the instruction 420 is triggered, and the instruction 420 is sent to the table manager 126.

The instruction 420 may be received in the form of a state specification from the GUI. Specifically, each change to the GUI may result in a new or updated state specification 420 that operates as an instruction to the table manager 126. The initial presentation of the modified base table may be in response to a table request made through the GUI. For example, a user of the client computing system may select the modified base table from a group of tables presented for display on the GUI. The instruction 420 to edit the modified base table may be received without presenting 402 the modified base table. The table edit is an instruction to change the modified base table. For example, the table edit may be a new row to add to the modified base table. As another example, the table edit may be a change to an existing row in the modified base table.

The modified base table is a table stored on a database within the cloud-based data warehouse. The modified base table is a combination of a base table and a modifications table. The modified base table may be used to allow a group of clients to appear to edit a base table but without making any actual edits to the base table on the cloud-based data warehouse. For example, a base table may include data from a particular source and be treated as a source-of-truth dataset. Using a modified base table, the table manager allows a group of clients to manipulate and/or add to the base table without altering the underlying base table. The manipulations and additions to the base table are stored separately in the modifications table (also referred to as a companion table). When one of the group of clients requests the base table, the modified base table is generated by combining the base table with the modifications table and presented to the client.

Both the base table and modifications table may exist on the cloud-based data warehouse 192. Alternatively, the modifications table may reside on another computing system, such as the intermediary computer system. The base table may be a table that the table manager or source of the instruction 420 is restricted from editing. The modifications table may be a table that the table manager or source of the instruction 420 is not restricted from editing.

The base table may include (or exclusively include) data stored thereupon by an entity or entities that are separate and distinct from the entity or entities storing data on the modifications table. In other words, the modifications table includes edits made by a first category of clients, and the base table includes edits made by a second category of clients. The first category of client may be clients that access the database on the cloud-based data warehouse using the table manager and the second category of client may be clients that access the database on the cloud-based data warehouse directly and/or without using the table manager. Alternatively, the first category of clients may be a first group of users of the table manager with a first set of permissions (e.g., permission to edit the modifications table) and the second category of clients may be a second group of users of the table manager with a second set of permissions (e.g., permission to edit the base table).

The method of FIG. 4 also includes locating 404, by the table manager 126, a modifications table on the cloud-based data warehouse 192 associated with the modified base table, wherein the modified base table comprises a base table and the modifications table. Locating 404 the modifications table on the cloud-based data warehouse 192 may be carried out by searching the cloud-based data warehouse for the modifications table using a modifications table identifier (the identifier may be derived from the instruction 420 or modified base table). Alternatively, the location of the modifications table may be stored with the base table on the cloud-based data warehouse. Finally, locating the modifications table may include accessing a data structure mapping the modified base table to the modifications table. The data structure may be on the cloud-based data warehouse or reside on the intermediary computing system with the table manager. Once the entry for the particular modified base table is retrieved, the address for the modifications table in the entry may be used to locate the modifications table.

The method of FIG. 4 also includes servicing 406 the instruction 420 to edit the modified base table by generating a database statement targeting the cloud-based data warehouse 192 to apply the table edit to the modifications table associated with the modified base table. Generating the database statement to apply the table edit to the modifications table may be carried out by the table manager 126 or query compiler on the intermediary computing system using the table edit to create the database statement. Creating the database statement may include lowering the intermediate representation into the database statement. The database statement may be a structured query language statement. Servicing 406 the instruction 420 to edit the modified base table may further include sending the database statement to the cloud-based data warehouse and receiving a response (i.e., a query result) in response. The response may be an acknowledgement that the edit has been committed to the database.

The above limitations improve the operation of the computer system by separating edits to a base table from the base table itself. This is accomplished by making the received edits to a modifications table. The modifications table is subsequently combined with the base table for presentation to a requesting client.

Figure 5:
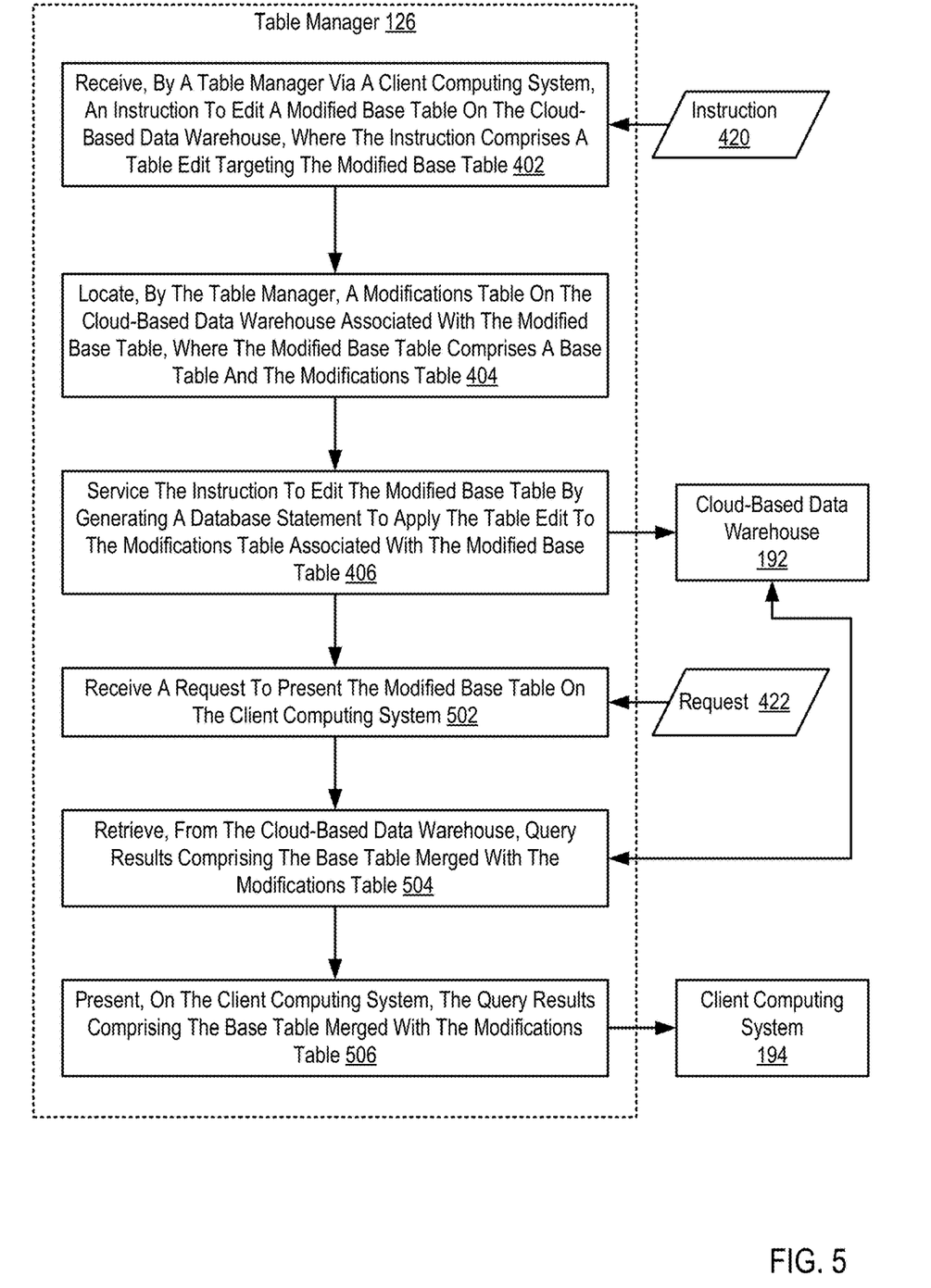
FIG. 5 sets forth a flow chart illustrating an exemplary method for editing and updating database tables on a cloud-based data warehouse according to embodiments of the present invention.

For further explanation, FIG. 5 sets forth a flow chart illustrating a further exemplary method for editing and updating database tables on a cloud-based data warehouse according to embodiments of the present invention that includes receiving 402, by a table manager 126 via a client computing system, an instruction 420 to edit a modified base table on the cloud-based data warehouse 192, wherein the instruction 420 comprises a table edit targeting the modified base table; locating 404, by the table manager 126, a modifications table on the cloud-based data warehouse 192 associated with the modified base table, wherein the modified base table comprises a base table and the modifications table; and servicing 406 the instruction 420 to edit the modified base table by generating a database statement targeting the cloud-based data warehouse 192 to apply the table edit to the modifications table associated with the modified base table.

The method of FIG. 5 differs from the method of FIG. 4, however, in that the method of FIG. 5 further includes receiving 502 a request 422 to present the modified base table on the client computing system 194. Receiving 502 a request 422 to present the modified base table on the client computing system 194 may be carried out by detecting that a user has manipulated elements of the GUI and/or submitted data using the GUI such that the generation of the request 422 is triggered, and the request 422 is sent to the table manager 126. The request 422 may be received in the form of a state specification from the GUI. For example, the user of the client computing system may select the modified base table from a group of tables presented for display on the GUI. The request 422 may be targeting the base table and the table manager 126 may instead present the modified base table to the source of the request 422. Consequently, the entity requesting the base table may be under the impression that they are editing the base table instead of the modified base table.

The method of FIG. 5 also includes retrieving 504, from the cloud-based data warehouse 192, query results comprising the base table merged with the modifications table. Retrieving 504 the query results from the cloud-based data warehouse may be carried out by generating a subsequent database statement that joins, merges, unions, or otherwise combines the base table with the modifications table on the cloud-based data warehouse, which in turn provides the resulting modified base table in the query results. The query results may include the modified base table or include the base table and modifications table which are subsequently combined by the table manager 126.

Changes to the base table are subsequently reflected in the query results. Specifically, the base table may be updated by entities with access to the base table. The changes made to the base table are presented in subsequent query results containing the modified base table. Such changes may also affect additions or modifications from the modification table. For example, if the modifications table adds a column with a formula that uses a column from the base table as an input, as the values from the base table column are changed, the results in the formula column within the resulting modified base table are also changed.

The method of FIG. 5 also includes presenting 506, on the client computing system 194, the query results comprising the base table merged with the modifications table. Presenting 506 the query results on the client computing system 194 may be carried out by arranging the modified base table to display in the GUI of the client computing system.

In view of the explanations set forth above, readers will recognize that the benefits of editing and updating database tables on a cloud-based data warehouse according to embodiments of the present invention include:
- Improving the operation of the computer system by separating edits to a base table from the base table itself, improving and maintaining the security of the base table.
- Improving the operation of a computing system by managing modifications to a base table on an intermediary computing system, increasing system ease of use, robustness, and resiliency.

Exemplary embodiments of the present invention are described largely in the context of a fully functional computer system for editing and updating database tables on a cloud-based data warehouse. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method for editing and updating database tables on a cloud-based data warehouse, the method comprising:
   receiving by a table manager on an intermediary computing system, a request to present a database table on a client computing system;
   retrieving, by the table manager from the cloud-based data warehouse, query results comprising a base table merged with a modifications table;
   presenting, by the table manager on the client computing system, the query results as the database table comprising the base table merged with the modifications table;
   receiving, by the table manager from the client computing system, an instruction to edit the database table on the cloud-based data warehouse, wherein the instruction comprises a table edit targeting the database table;
   locating, by the table manager, the modifications table on the cloud-based data warehouse associated with the database table, including accessing a data structure mapping the database table to the modifications table; and
   servicing the instruction to edit the database table by generating a database statement targeting the cloud-based data warehouse to apply the table edit to the modifications table associated with database table, wherein the database statement targeting the cloud-based data warehouse is generated by the intermediary computing system.

2. The method of claim 1, wherein a change to the base table is subsequently reflected in the query results, and wherein the instruction is received from a graphical user interface (GUI) on the client computing system.

3. The method of claim 1, wherein the modifications table comprises edits made by a first category of clients, and wherein the base table comprises edits made by a second category of clients.

4. The method of claim 1, wherein the table manager is restricted from editing the base table.

5. The method of claim 1, wherein the table edit comprises a new row to add to the database table.

6. The method of claim 1, wherein the table edit comprises a change to an existing row in the database table.

7. The method of claim 1, wherein the database statement is a structured query language statement.

8. An apparatus for editing and updating database tables on a cloud-based data warehouse, the apparatus comprising a computer processor, a computer memory operatively coupled to the computer processor, the computer memory having disposed within it computer program instructions that, when executed by the computer processor, cause the apparatus to carry out the steps of:
   receiving by a table manager on an intermediary computing system, a request to present a database table on a client computing system;
   retrieving, by the table manager from the cloud-based data warehouse, query results comprising a base table merged with a modifications table;
   presenting, by the table manager on the client computing system, the query results as the database table comprising the base table merged with the modifications table;
   receiving, by the table manager from the client computing system, an instruction to edit a database table on the cloud-based data warehouse, wherein the instruction comprises a table edit targeting the database table;
   locating, by the table manager, a modifications table on the cloud-based data warehouse associated with the database table, including accessing a data structure mapping the database table to the modifications table; and
   servicing the instruction to edit the database table by generating a database statement targeting the cloud-based data warehouse to apply the table edit to the modifications table associated with database table, wherein the database statement targeting the cloud-based data warehouse is generated by the intermediary computing system.

9. The apparatus of claim 8, wherein a change to the base table is subsequently reflected in the query results.

10. The apparatus of claim 8, wherein the modifications table comprises edits made by a first category of clients, and wherein the base table comprises edits made by a second category of clients.

11. The apparatus of claim 8, wherein the table manager is restricted from editing the base table.

12. The apparatus of claim 8, wherein the table edit comprises a new row to add to the database table.

13. The apparatus of claim 8, wherein the table edit comprises a change to an existing row in the database table.

14. A computer program product for editing and updating database tables on a cloud-based data warehouse, the computer program product disposed upon a computer readable storage medium, the computer program product comprising computer program instructions that, when executed, cause a computer to carry out the steps of:

- receiving by a table manager on an intermediary computing system, a request to present a database table on a client computing system;
- retrieving, by the table manager from the cloud-based data warehouse, query results comprising a base table merged with a modifications table;
- presenting, by the table manager on the client computing system, the query results as the database table comprising the base table merged with the modifications table;
- receiving, by the table manager from the client computing system, an instruction to edit a database table on the cloud-based data warehouse, wherein the instruction comprises a table edit targeting the database table;
- locating, by the table manager, a modifications table on the cloud-based data warehouse associated with the modified base table, including accessing a data structure mapping the database table to the modifications table; and
- servicing the instruction to edit the database table by generating a database statement targeting the cloud-based data warehouse to apply the table edit to the modifications table associated with the database table, wherein the database statement targeting the cloud-based data warehouse is generated by the intermediary computing system.

* * * * *